United States Patent [19]

Li

[11] Patent Number: 5,968,334
[45] Date of Patent: Oct. 19, 1999

[54] PROCESS FOR RECOVERING $CF_4$ AND $C_2F_6$ FROM VENT GASES OF AN ALUMINUM PRODUCTION CELL

[75] Inventor: Yao-En Li, Buffalo Grove, Ill.

[73] Assignee: American Air Liquide Inc., Walnut Creek, Calif.

[21] Appl. No.: 09/071,200

[22] Filed: May 1, 1998

Related U.S. Application Data

[62] Division of application No. 08/772,469, Dec. 23, 1996, Pat. No. 5,814,127.

[51] Int. Cl.⁶ ........................................ C25C 3/22
[52] U.S. Cl. ............................ 205/391; 205/392
[58] Field of Search ................... 205/391, 392; 204/247

[56] References Cited

U.S. PATENT DOCUMENTS

| | | | |
|---|---|---|---|
| 2,947,687 | 8/1960 | Lee | 210/23 |
| 2,953,502 | 9/1960 | Binning et al. | 202/12 |
| 2,960,462 | 11/1960 | Lee et al. | 208/308 |
| 2,970,106 | 1/1961 | Binning et al. | 208/347 |
| 3,508,994 | 4/1970 | Nyrop | 156/280 |
| 3,616,607 | 11/1971 | Klass et al. | 55/16 |
| 3,648,845 | 3/1972 | Riley | 210/490 |
| 3,823,079 | 7/1974 | Beeler | 205/391 |
| 3,827,955 | 8/1974 | Bahri et al. | 205/391 |
| 3,904,494 | 9/1975 | Jacobs et al. | 205/391 X |
| 4,006,066 | 2/1977 | Sparwald | 205/391 |
| 4,086,310 | 4/1978 | Bottenbruch et al. | 264/41 |
| 4,113,628 | 9/1978 | Alegranti | 210/500 |
| 4,132,824 | 1/1979 | Kimura et al. | 428/516 |
| 4,155,793 | 5/1979 | Salemme et al. | 156/246 |
| 4,156,597 | 5/1979 | Browall | 55/16 |
| 4,192,824 | 3/1980 | Robinson et al. | 585/409 |
| 4,378,324 | 3/1983 | Makino et al. | 364/41 |
| 4,460,526 | 7/1984 | Makino et al. | 264/41 |
| 4,474,662 | 10/1984 | Makino et al. | 264/41 |
| 4,485,056 | 11/1984 | Makino et al. | 264/41 |
| 4,512,893 | 4/1985 | Makino et al. | 210/500 |
| 4,602,922 | 7/1986 | Cabasso et al. | 55/158 |
| 4,664,669 | 5/1987 | Ohyabu et al. | 623/66 |
| 4,689,267 | 8/1987 | Takamizawa et al. | 428/376 |
| 4,713,292 | 12/1987 | Takemura et al. | 428/373 |
| 4,714,481 | 12/1987 | Matsuura et al. | 55/158 |
| 4,717,394 | 1/1988 | Hayes | 55/158 |
| 4,741,829 | 5/1988 | Takemura et al. | 210/500 |
| 4,756,932 | 7/1988 | Puri | 427/175 |
| 4,770,752 | 9/1988 | Gianfranco | 205/391 |
| 4,826,599 | 5/1989 | Bikson et al. | 210/500 |
| 5,085,676 | 2/1992 | Ekiner et al. | 55/158 |

FOREIGN PATENT DOCUMENTS

| | | |
|---|---|---|
| 613352 | 1/1961 | Canada .................................. 205/391 |
| 0 117 338 | 9/1984 | European Pat. Off. . |
| 0 389 126 | 9/1990 | European Pat. Off. . |
| 0 521 203 | 1/1993 | European Pat. Off. . |
| 0 754 487 | 1/1997 | European Pat. Off. . |

OTHER PUBLICATIONS

Database WPI, Section Ch, Week 8640, Derwent Publications Ltd., London, GB, Class A14, AN 86–260855 (No Date).

Alton T. Tabereaux, Anode Effests, PFCs, Global Warming, and the Aluminum Industry, JOM, pp. 30–34 (Nov. 1994).

*Primary Examiner*—Donald R. Valentine
*Attorney, Agent, or Firm*—Burns, Doane, Swecker & Mathis, LLP

[57] ABSTRACT

A process for recovering at least one of $CF_4$ and $C_2F_6$ from a vent gas from an aluminum electrolysis cell. The process includes the steps of:

(a) removing inorganic fluorides from a vent gas comprising inorganic fluorides and at least one of $CF_4$ and $C_2F_6$ to obtain a purified vent gas; and (b) contacting the purified vent gas with a membrane at conditions effective to obtain a retentate stream rich in at least one of $CF_4$ and $C_2F_6$, and a permeate stream depleted in at least one of $CF_4$ and $C_2F_6$.

8 Claims, 3 Drawing Sheets

PROCESS FLOW DIAGRAM FOR C2F6 AND CF4 RECYCLE

PERMEABILITIES OF N2, CF4 AND C2F6 AT DIFFERENT TEMPERATURES

ENGINEERING DESIGN OF MEMBRANE SYSTEM

PROCESS FOR RECOVERING $CF_4$ AND $C_2F_6$ FROM VENT GASES OF AN ALUMINUM PRODUCTION CELL

This application is a divisional of application Ser. No. 08/772,469, filed Dec. 23, 1996 now U.S. Pat. No. 5,814,127.

FIELD OF THE INVENTION

The present invention generally relates to a gas separation process. The invention particularly relates to a process for removing at least one of $CF_4$ and $C_2F_6$ from a gas stream using a membrane. The invention also particularly relates to a method of making aluminum, which method includes removing at least one of $CF_4$ and $C_2F_6$ from a gas stream using a membrane.

BACKGROUND OF THE INVENTION

Currently, aluminum metal is commercially manufactured in two steps. The first step involves extracting alumina ($Al_2O_3$) from bauxite using a Bayer process. The second step involves reducing the alumina which is dissolved in a mixture of molten cryolite ($Na_3AlF_6$) and aluminum trifluoride ($AlF_3$) in an electrolysis cell at about 950 to 960° C. using the Hall-Heroult process. In the second step, aluminum-containing ions are reduced electrochemically to produce metallic aluminum at the metal cathode surface.

During normal electrolysis, carbon anodes are consumed as oxygen-containing ions react with the carbon anodes to form carbon dioxide and aluminum metal according to the following equation:

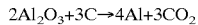

$$2Al_2O_3 + 3C \rightarrow 4Al + 3CO_2$$

However, at certain conditions, the electrolysis cell approaches an anode effect. This approach is characterized by the following events:

(1) The alumina concentration in the bulk of the electrolyte decreases below 2% by weight;
(2) Higher concentrations of fluoride ions prevail near the anode as the concentration of oxygen containing ions decreases;
(3) The anode polarization voltage increases significantly;
(4) The critical current density of the carbon anode is exceeded for the discharge of only oxygen-containing anions; and
(5) $F_2$ is eventually discharged at the anode surface from the decomposition of cryolite.

During anode effects, the fluorine discharged at the anode reacts with the carbon to form $CF_4$ and $C_2F_6$ according to the following equation:

$$2Na_3AlF_6 + 2C \rightarrow 2Al + 2NaF + CF_4 + C_2F_6$$

For a more detailed discussion of the anode effect, see Alton T. Tabereaux, *Anode Effects, PFCs, Global Warming, and the Aluminum Industry*, JOM, pp. 30–34 (November 1994).

For a typical electrolysis cell, the emission rate of $CF_4$ and $C_2F_6$ per day is 0.25 kg. There are normally 100 to 200 cells per plant. Therefore, the daily emission of $CF_4$ and $C_2F_6$ per plant is about 50 kg.

The emission of $CF_4$ and $C_2F_6$ from aluminum plants has typically been vented directly into the atmosphere. However, these gases, which are 10,000 times more potent than $CO_2$, have recently been classified as global warming gases. Thus, with the signing of the United Nations Framework Convention on Climate Change which is aimed at reducing the emission of global warming gases, there is a significant need in the industry for a way to minimize or eliminate the emission of these gases into the atmosphere.

Accordingly, it is an object of the present invention to address this need in the aluminum industry.

These and other objects of the invention will become apparent in light of the following specification, and the appended drawings and claims.

SUMMARY OF THE INVENTION

The present invention relates to a process for recovering at least one of $CF_4$ and $C_2F_6$ from a vent gas from an aluminum electrolysis cell. The process comprises the steps of:

(a) removing inorganic fluorides from a vent gas comprising inorganic fluorides and at least one of $CF_4$ and $C_2F_6$ to obtain a purified vent gas; and
(b) contacting the purified vent gas with a membrane at conditions effective to obtain a retentate stream rich in at least one of $CF_4$ and $C_2F_6$, and a permeate stream depleted in at least one of $CF_4$ and $C_2F_6$.

In another aspect, the present invention relates to a method of making aluminum. The method includes the steps of:

(a) electrolytically reducing alumina dissolved in a mixture of molten cryolite and aluminum trifluoride in an electrolysis cell to produce aluminum;
(b) withdrawing a vent gas comprising $F_2$, HF, and at least one of $CF_4$ and $C_2F_6$ from the electrolysis cell;
(c) contacting the vent gas with alumina at conditions effective to react $F_2$ and HF with the alumina to produce aluminum trifluoride and a gas stream comprising the at least one of $CF_4$ and $C_2F_6$;
(d) recycling at least a portion of the aluminum trifluoride from step (c) to the electrolysis cell; and
(e) contacting the gas stream comprising the at least one of $CF_4$ and $C_2F_6$ with a membrane at conditions effective to obtain a retentate stream rich in at least one of $CF_4$ and $C_2F_6$, and a permeate stream depleted in at least one of $CF_4$ and $C_2F_6$.

DETAILED DESCRIPTION OF THE PREFERRED EMBODIMENTS

In its broadest aspect, the present invention relates to a process for removing at least one of $CF_4$ and $C_2F_6$ from a gas stream. Preferably, the present invention relates to a process for removing both $CF_4$ and $C_2F_6$ from a gas stream containing the same.

Prior to separation, the gas stream preferably contains from about 0.01 to about 20% by volume of at least one of $CF_4$ and $C_2F_6$. In addition to containing at least one of $CF_4$ and $C_2F_6$, the gas stream can include oxygen, carbon dioxide, and nitrogen as well as other gaseous components.

The process according to the present invention comprises the step of contacting the gas stream with a membrane at conditions effective to obtain a retentate stream rich in at least one of $CF_4$ and $C_2F_6$, and a permeate stream depleted in at least one of $CF_4$ and $C_2F_6$. Preferably, the retentate stream is depleted in oxygen, carbon dioxide, and nitrogen while the permeate stream is rich in oxygen, carbon dioxide, and nitrogen. If both $CF_4$ and $C_2F_6$ are present in the gas stream, then the contacting step preferably produces a retentate stream rich in both $CF_4$ and $C_2F_6$, and a permeate stream depleted in both $CF_4$ and $C_2F_6$.

As used in this specification and the claims, the term "rich" means that the concentration of a particular component in that stream is greater than the concentration of the same component in the feed stream. Likewise, the term "depleted" means that the concentration of a particular component in that stream is less than the concentration of the same component in the feed stream.

The retentate stream preferably comprises from about 25 to about 100% by volume of at least one of $CF_4$ and $C_2F_6$. The permeate stream preferably comprises from about 0 to about 0.01% by volume of at least one of $CF_4$ and $C_2F_6$.

Figure 3:
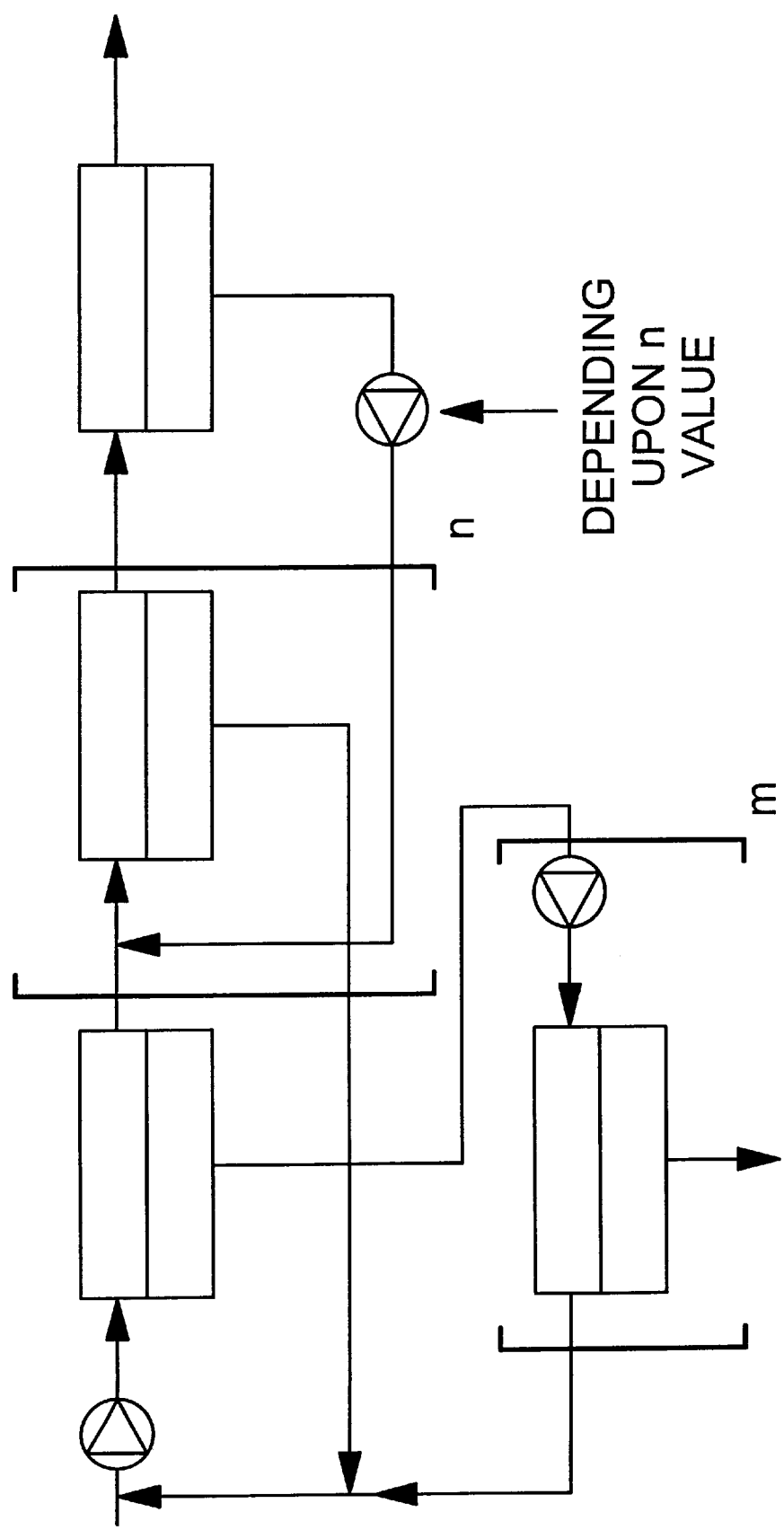
FIG. 3 illustrates an engineering design of a membrane system that can be employed in the present invention.

In a preferred embodiment, the purity of the permeate and retentate streams is improved by contacting the streams with additional membranes arranged in series. Such a process may be carried out according to the multi-step membrane separation system shown in FIG. 3. As shown in FIG. 3, each of the permeate and retentate streams may be passed to another membrane contacting unit to increase the purity of the stream. The number of contacting steps "m" and "n" may vary depending on the purity desired. By using such a process, it is possible to obtain 100% recovery of at least one of $CF_4$ and $C_2F_6$ with a purity approaching 100%.

Any membrane can be used in the process according to the present invention so long as the membrane can selectively retain at least one of $CF_4$ and $C_2F_6$ while passing the other components in the gas stream through. The membrane should also be substantially non-reactive with the gaseous components to be separated.

Membranes useful in the invention are preferably glassy membranes such as polymer membranes made preferably from polyimides; polyamides; polyamide-imides; polyesters polycarbonates; polysulfones; polyethersulfone; polyetherketone; alkyl substituted aromatic polyesters; blends of polyethersulfone, aromatic polyimides, aromatic polyamides, polyamides-imides, fluorinated aromatic polyimide, polyamide, and polyamide-imides; glassy polymeric membranes such as those disclosed in U.S. Ser. No. 08/247,125 filed May 20, 1994, the content of which is hereby incorporated by reference; cellulose acetates; and blends thereof, copolymers thereof, substituted polymers (e.g. alkyl, aryl) thereof and the like.

Asymmetric membranes are prepared by the precipitation of polymer solutions in solvent-miscible nonsolvents. Such membranes are typified by a dense separating layer supported on an anisotropic substrate of a graded porosity and are generally prepared in one step. Examples of such membranes and their methods of manufacture are disclosed in U.S. Pat. Nos. 4,113,628; 4,378,324; 4,460,526; 4,474,662; 4,485,056; 4,512,893; 5,085,676; and 4,717,394; all incorporated herein by reference. The '394 and '676 patents disclose preparation of asymmetric separation membranes from selected polyimides. Particularly preferred membranes are polyimide asymmetric gas separation membranes as disclosed in the '676 patent.

In a pressure driven gas membrane separation process, one side of the gas separation membrane is contacted with a complex multicomponent gas mixture and certain of the gases of the mixture permeate through the membrane faster than the other gases. Gas separation membranes thereby allow some gases to permeate through them while serving as a barrier to other gases in a relative sense. The relative gas permeation rate through the membrane is a property of the membrane material composition and its morphology. It has been suggested in the prior art that the intrinsic permeability of a polymer membrane is a combination of gas diffusion through the membrane, controlled in part by the packing and molecular free volume of the material, and gas solubility within the material. Selectivity is the ratio of the permeabilities of two gases being separated by a material. It is also highly desirable to form defect-free dense separating layers in order to retain high gas selectivity.

Composite gas separation membranes typically have a dense separating layer on a preformed microporous substrate. The separating layer and the substrate are usually different in composition. Composite gas separation membranes have evolved to a structure of an ultrathin, dense separating layer supported on an anisotropic, microporous substrate. These composite membrane structures can be prepared by laminating a preformed ultrathin dense separating layer on top of a preformed anisotropic support membrane. Examples of such membranes and their methods of manufacture are disclosed in U.S. Pat. Nos. 4,664,669; 4,689,267; 4,741,829; 2,947,687; 2,953,502; 3,616,607; 4,714,481; 4,602,922; 2,970,106; 2,960,462; 4,713,292; 4,086,310; 4,132,824; 4,192,824; 4,155,793; and 4,156,597; all incorporated herein by reference.

Alternatively, composite gas separation membranes may be prepared by multistep fabrication processes, wherein first an anisotropic, porous substrate is formed, followed by contacting the substrate with a membrane-forming solution. Examples of such methods are described in U.S. Pat. Nos. 4,826,599; 3,648,845; and 3,508,994; all incorporated herein by reference.

U.S. Pat. No. 4,756,932 describes how composite hollow-fiber membranes may also be prepared by co-extrusion of multiple polymer solution layers, followed by precipitation in a solvent-miscible nonsolvent.

According to one embodiment of the present invention, the membrane can be post-treated with, or coated by, or co-extruded with, a fluorinated or perfluorinated polymer layer in order to increase its ability to withstand harmful constituents in the gas mixture from which PFCs are to be separate, at low levels or temporary contact with such components.

The hollow-fiber spinning process depends on many variables which may affect the morphology and properties of the hollow-fiber membrane. These variables include the composition of the polymer solution employed to form the fiber, the composition of fluid injected into the bore of the hollow-fiber extrudate during spinning, the temperature of the spinneret, the coagulation medium employed to treat the hollow-fiber extrudate, the temperature of the coagulation medium, the rapidity of coagulation of the polymer, the rate of extrusion of the fiber, takeup speed of the fiber onto the takeup roll, and the like.

The temperature of the gas mixture and/or the membrane during the contacting step can vary from about −10° C. to about 100° C. Preferably, the temperature is between about 10° C. and 80° C. More preferably, the temperature ranges from ambient, i.e., from about 20° C. to 25° C., to about 60° C.

It is preferred, according to the present invention, to have a pressure drop across the membrane of less than about 2,000 psig. More preferably, the pressure drop ranges from about 3 to about 200 psig. Even more preferably, the pressure drop is about 20 to about 60 psig.

The requisite pressure drop across the membrane can be provided in one of two ways. First, the feed gas stream can be compressed. Preferred compressors are sealed and oil-free, such as the compressors sold under the tradename POWEREX, available from the Powerex Harrison Company of Ohio. Second and more preferably, the pressure drop across the membrane can be established by lowering the pressure on the permeate side of the membrane. To create the lower pressure on the permeate side, a vacuum pump or any other suction device can be used.

The flowrate of the gas stream across the membrane can vary from about 0 to about $10^5$ $Nm^3/h$ per square meter of membrane available for separation. Preferably, the flowrate is from about $10^{-4}$ to about 10 $Nm^3/h\text{-}m^2$. More preferably, the flowrate is from about 0.1 to about 0.5 $Nm^3/h\text{-}m^2$.

In a preferred aspect, the present invention relates to a process for recovering at least one of $CF_4$ and $C_2F_6$ from a vent gas from an aluminum electrolysis cell. The vent gas comprises (1) gaseous components such as $O_2$, $CO_2$, and $N_2$; (2) inorganic fluorides such as $F_2$, HF, and $NaAlF_4$; and (3) at least one of $CF_4$ and $C_2F_6$. The vent gas can also include some hydrocarbons and a large amount of particulates.

The first step in this process involves removing the inorganic fluorides from the vent gas to produce a purified vent gas. The inorganic fluorides are preferably removed from the vent gas by using a caustic scrubber. The scrubber can be wet or dry. Dry scrubbers are usually resin-type scrubbers or soda-lime, while some dry scrubbers comprising catalysts such as $MnO_2$ can also be used. Exemplary wet scrubbers that can be used in the present invention are described in the brochure entitled, "Selecting a CDO™ for Your Particular Application" from DELATECH Corporation, which brochure is hereby incorporated by reference. When various harmful constituents have to be removed, it is preferred to use a dry scrubber or scrubbers in series with a wet scrubber or scrubbers.

Preferably, upstream of the scrubber or scrubbers, one or more filters are employed to remove the particulates from the vent gas. It is preferred to use a filter having a pore size diameter of less than 20 micrometers, and more preferably, less than 10 micrometers.

The second step in this process involves contacting the purified vent gas with a membrane at conditions effective to obtain a retentate stream rich in at least one of $CF_4$ and $C_2F_6$, and a permeate stream depleted in at least one of $CF_4$ and $C_2F_6$. This membrane separation step can be carried out as described above.

If there are remaining particulates in the purified vent gas before it is passed to the membrane separation unit, it is contemplated by the present invention to employ an additional filter or filters to remove such particulates.

In another preferred aspect, the present invention relates to a method of making aluminum. The method includes the steps of:

(a) electrolytically reducing alumina dissolved in a mixture of molten cryolite and aluminum trifluoride in an electrolysis cell to produce aluminum;

(b) withdrawing a vent gas comprising $F_2$, HF, and at least one of $CF_4$ and $C_2F_6$ from the electrolysis cell;

(c) contacting the vent gas with alumina at conditions effective to react $F_2$ and HF with the alumina to produce aluminum trifluoride and a gas stream comprising the at least one of $CF_4$ and $C_2F_6$;

(d) recycling at least a portion of the aluminum trifluoride from step (c) to the electrolysis cell; and (e) contacting the gas stream comprising the at least one of $CF_4$ and $C_2F_6$ with a membrane at conditions effective to obtain a retentate stream rich in at least one of $CF_4$ and $C_2F_6$, and a permeate stream depleted in at least one of $CF_4$ and $C_2F_6$.

Figure 1:
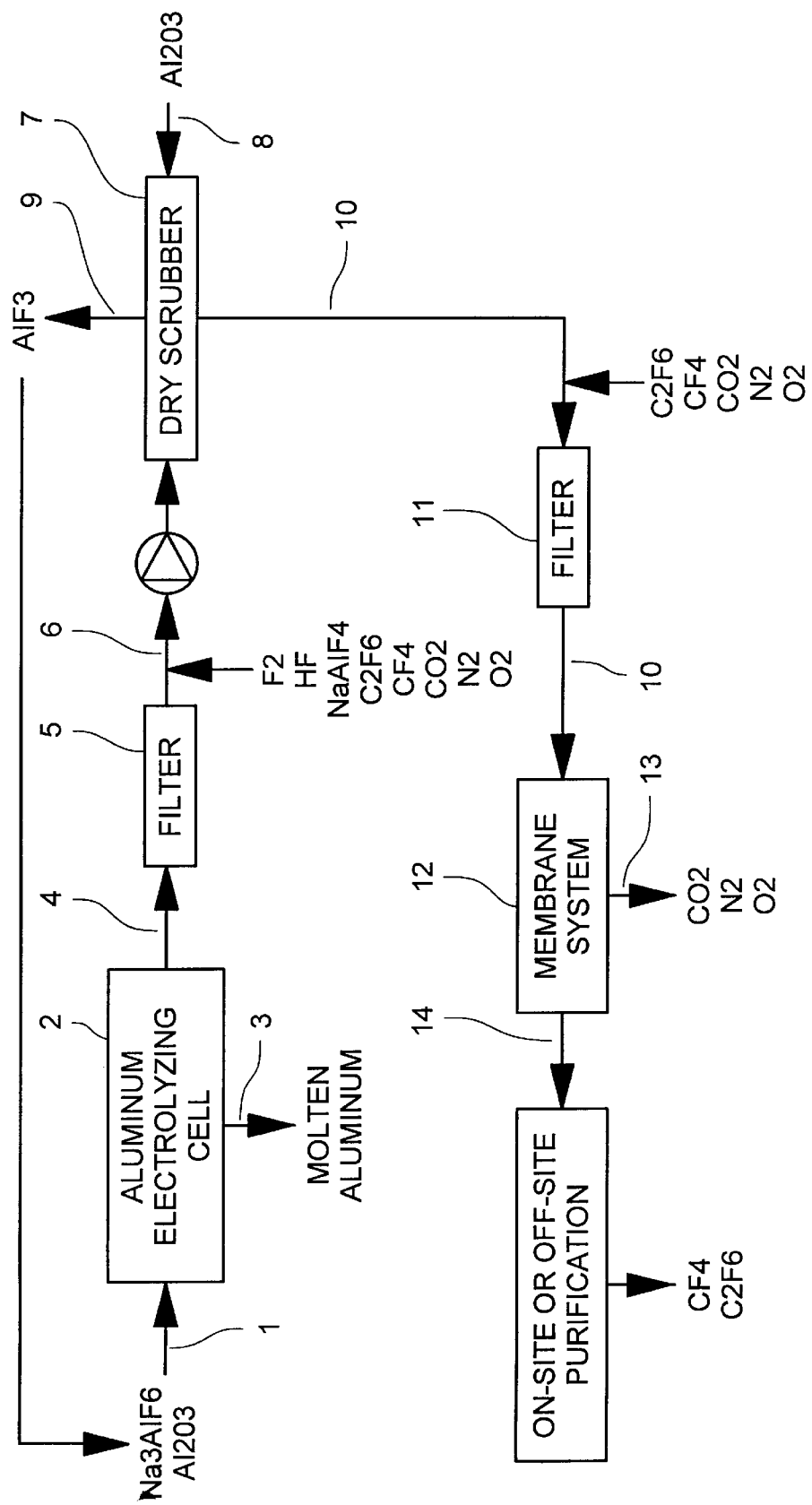
FIG. 1 depicts a process flow diagram for recovering $CF_4$ and $C_2F_6$ according to the present invention.

The general features of this method are illustrated in FIG. 1. Referring to FIG. 1, a stream 1 of alumina, cryolite, and aluminum trifluoride is fed into an aluminum electrolyzing cell 2 where molten aluminum is produced by electrolytically reducing the alumina. The operating conditions and equipment necessary to carry out this step are well known to those skilled in the art.

The molten aluminum is then withdrawn from the electrolyzing cell 2 through line 3. A vent gas stream 4 is also withdrawn from the electrolyzing cell 2. The vent gas stream 4 comprises $O_2$, $CO_2$, $N_2$, $F_2$, HF, $NaAlF_4$, $CF_4$, $C_2F_6$, and particulates. The vent gas stream 4 is optionally passed to a filter 5 to remove the particulates therein.

A filtered vent gas 6 is optionally withdrawn from filter 5 and passed to a dry scrubbing zone 7. In the scrubbing zone 7, the filtered vent gas 6 is contacted with alumina introduced through line 8 at conditions effective to remove inorganic fluorides such as $F_2$ and HF therefrom. These conditions for carrying out this scrubbing step are well known to those skilled in the art. During the scrubbing step, the alumina reacts with $F_2$ and HF in the filtered vent gas 6 to form aluminum trifluoride according to the following equations:

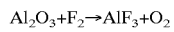

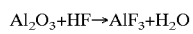

A stream 9 comprising the aluminum trifluoride is then withdrawn from the dry scrubbing zone 7 and recycled to stream 1. The dry scrubbing zone 7 also yields a purified vent gas stream 10 containing $CF_4$, $C_2F_6$, $O_2$, $CO_2$, and $N_2$. Stream 10 is passed to an additional filter 11, if necessary, to remove any remaining particulates therein. The purified vent gas stream 10 is next passed to a membrane separation system 12 such as the one described above and illustrated in FIG. 3 where a retentate stream 14 and a permeate stream 13 are produced. The permeate stream 13 comprises mostly of $O_2$, $CO_2$, and $N_2$, while the retentate stream 14 comprises mostly of $CF_4$ and $C_2F_6$. The retentate stream 14 comprising $CF_4$ and $C_2F_6$ may be further purified on or off-site to produce a $CF_4/C_2F_6$ stream suitable for use in the semiconductor industry.

EXAMPLES

The following examples are provided to illustrate the present invention and are not to be construed as a limitation thereof.

Example 1

Figure 2:
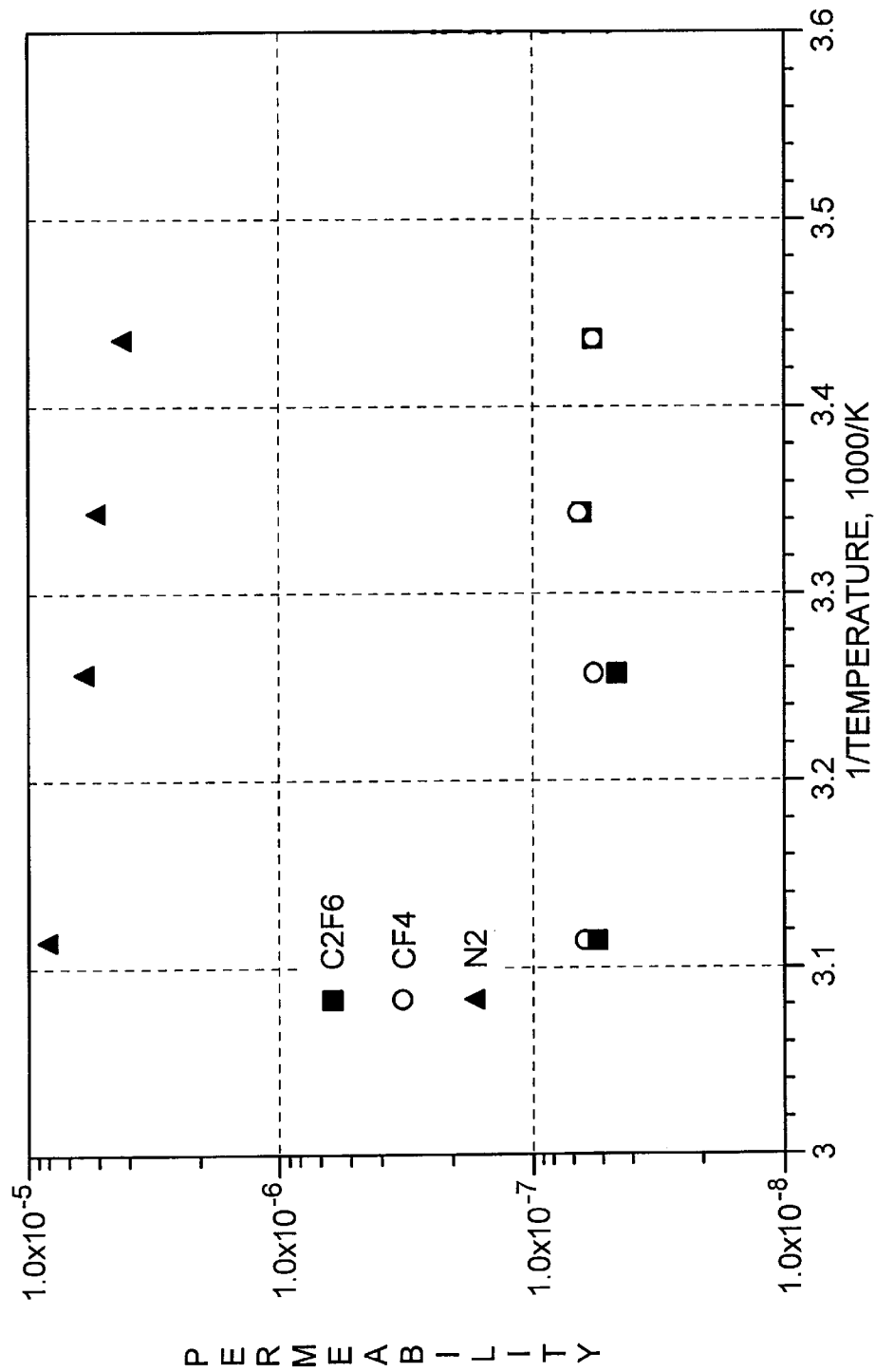
FIG. 2 is a graph showing the relative permeabilities of $N_2$, $CF_4$, and $C_2F_6$ through a particular membrane at different temperatures.

A gas stream comprising $CF_4$, $C_2F_6$, and $N_2$ was contacted with a polyimide, asymmetric composite hollow fiber membrane at various temperatures to measure the relative permeabilities of $CF_4$, $C_2F_6$, and $N_2$. The gas stream had a constant flowrate rate of 170 sccm. The pressure of the feed gas was kept constant at 3 bar. The permeabilities of each of these components are graphically shown in FIG. 2. As seen from FIG. 2, the selectivities of $CF_4/N_2$ and $C_2F_6/N_2$ are on the order of 300.

Based on the above selectivities, a computer simulation of a single stage membrane separation unit was conducted. The concentration and pressure of the feed, permeate, and retentate as well as the $CF_4/C_2F_6$ recovery are shown in Table 1 below.

TABLE 1

|  | Feed | Permeate | Retentate | $CF_4/C_2F_6$ Recovery |
|---|---|---|---|---|
| Flowrate (Nm$_3$/h) | 10 | 9.7 | 0.3 | |
| [CF$_4$] (vol %) | 0.1 | 1.2 × 10$^{-3}$ | 3.9 | |
| [C$_2$F$_6$] (vol %) | 0.1 | 1.5 × 10$^{-3}$ | 3.9 | |
| Pressure (bar) | 20 | 0.2 | 19.7 | |
| | | | | 98.7% |

Example 2

The procedure of Example 1 was repeated using the feed concentration and pressure listed in Table 2 below. The simulated results are also listed in Table 2.

TABLE 2

|  | Feed | Permeate | Retentate | $CF_4/C_2F_6$ Recovery |
|---|---|---|---|---|
| Flowrate (Nm$_3$/h) | 10 | 9.4 | 0.6 | |
| [CF$_4$] (vol %) | 1.0 | 0.04 | 16.5 | |
| [C$_2$F$_6$] (vol %) | 5.0 | 0.16 | 83.1 | |
| Pressure (bar) | 30 | 0.2 | 29.7 | |
| | | | | 96.9% |

Example 3

For a typical smelting plant with 100 smelting pots, the flowrate of the vent gas is about 3 Nm$^3$/h. The same procedure of Example 1 was followed using such a stream. The feed concentration and pressure as well as the simulated results of such a stream are reported in Table 3 below.

TABLE 3

|  | Feed | Permeate | Retentate | $CF_4/C_2F_6$ Recovery |
|---|---|---|---|---|
| Flowrate (Nm$_3$/h) | 3 | 2.6 | 0.4 | |
| [CF$_4$] (vol %) | 10.0 | 0.2 | 79.2 | |
| [C$_2$F$_6$] (vol %) | 1.0 | 0.02 | 7.9 | |
| Pressure (bar) | 10 | 1.0 | 9.7 | |
| | | | | 98.1% |

Example 4

In an actual experiment, a feed stream comprising 1.14% $CF_4$ and $C_2F_6$, and the balance $N_2$ was contacted with a polyimide, asymmetric composite hollow fiber membrane at room temperature. The flowrate, concentration, and pressure of the feed, permeate, and retentate streams along with the percentage recovery of $CF_4$ and $C_2F_6$ are reported in Table 4 below.

TABLE 4

|  | Feed | Permeate | Retentate | $CF_4/C_2F_6$ Recovery |
|---|---|---|---|---|
| Flowrate (scfh) | 313.8 | 310 | 3.8 | |
| [CF$_4$] (vol %) | 0.45 | <0.001 | 37.7 | |
| [C$_2$F$_6$] (vol %) | 0.69 | 0.003 | 57.9 | |
| Pressure (bar) | 7.8 | 1.0 | 7.7 | |
| | | | | 99.999% |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A method of producing aluminum comprising the steps of:
   (a) electrolytically reducing alumina dissolved in a mixture of molten cryolite and aluminum trifluoride in an electrolysis cell to produce aluminum;
   (b) withdrawing a vent gas comprising $F_2$, HF, and at least one of $CF_4$ and $C_2F_6$ from said electrolysis cell;
   (c) contacting said vent gas with alumina at conditions effective to react $F_2$ and HF with said alumina to produce aluminum trifluoride and a gas stream comprising said at least one of $CF_4$ and $C_2F_6$;
   (d) recycling at least a portion of said aluminum trifluoride from step (c) to said electrolysis cell; and
   (e) contacting said gas stream comprising said at least one of $CF_4$ and $C_2F_6$ with a membrane at conditions effective to obtain a retentate stream rich in at least one of $CF_4$ and $C_2F_6$, and a permeate stream depleted in at least one of $CF_4$ and $C_2F_6$.

2. The method according to claim 1, wherein said gas stream comprises both $CF_4$ and $C_2F_6$, and said retentate stream is rich in both $CF_4$ and $C_2F_6$, and said permeate stream is depleted in both $CF_4$ and $C_2F_6$.

3. The method according to claim 1, wherein said gas stream further comprises $O_2$, $CO_2$, and $N_2$.

4. The method according to claim 3, wherein said retentate stream is depleted in $O_2$, $CO_2$, and $N_2$, and said permeate stream is rich in $O_2$, $CO_2$, and $N_2$.

5. The method according to claim 1, wherein said gas stream comprises from about 0.01 to about 20% by volume of at least one of $CF_4$ and $C_2F_6$.

6. The method according to claim 5, wherein said retentate stream comprises from about 20 to about 100% by volume of at least one of $CF_4$ and $C_2F_6$, and said permeate stream comprises from about 0 to about 0.01% by volume of at least one of $CF_4$ and $C_2F_6$.

7. The method according to claim 1, wherein said conditions comprise a temperature between about 10 and about 80° C., a pressure drop between about 3 and about 200 psig, and a flowrate rate between about 10$^{-4}$ and about 10 Nm$^3$/h-m$^2$.

8. The method according to claim 1, wherein said membrane is selected from the group consisting of polyimides, polyamides, polyamide-imides, polyesters, polycarbonates, polysulfones, polyethersulfone, polyetherketone, alkyl substituted aromatic polyesters, and blends of polyethersulfone, aromatic polyimides, aromatic polyamides, polyamides-imides, fluorinated aromatic polyimide, polyamide, and polyamide-imides.

* * * * *